United States Patent [19]

King

[11] 4,086,476
[45] Apr. 25, 1978

[54] CONTROL CIRCUIT FOR A CODE READING DEVICE

[75] Inventor: Ronald J. King, Cambridge, Ohio

[73] Assignee: NCR Corporation, Dayton, Ohio

[21] Appl. No.: 709,741

[22] Filed: Jul. 29, 1976

[51] Int. Cl.² .......................... G06K 7/10; G08C 9/06
[52] U.S. Cl. ..................................... 235/462; 250/569
[58] Field of Search ................. 235/61.11 E; 250/555, 250/566, 568, 569

[56] References Cited

U.S. PATENT DOCUMENTS

| 3,086,121 | 4/1963 | Cockrell | 235/61.11 E |
| 3,229,073 | 1/1966 | Macker et al. | 235/61.11 E |
| 3,529,133 | 3/1966 | Kent et al. | 235/61.11 E |
| 3,562,494 | 11/1967 | Schmidt | 235/61.11 E |
| 3,586,833 | 9/1969 | Schafer | 235/61.11 E |
| 3,609,306 | 12/1969 | Langley | 235/61.11 E |
| 3,627,990 | 12/1971 | Sallach | 235/61.11 E |

Primary Examiner—Daryl W. Cook
Attorney, Agent, or Firm—J. T. Cavender; Wilbert Hawk, Jr.; Richard W. Lavin

[57] ABSTRACT

An optical reader control system is disclosed wherein signals generated from detecting means positioned upstream and downstream of the optical reader control the operation of the optical reader to enforce the movement of a merchandise item past the optical reader within a predetermined path. Logic circuitry is disclosed for processing the detecting means signals for determining the occurrence of a valid read operation by the optical reader.

16 Claims, 4 Drawing Figures

CONTROL CIRCUIT FOR A CODE READING DEVICE

BACKGROUND OF THE INVENTION

The present invention relates to a system for processing data derived from reading coded labels attached to merchandise items during a checkout operation. In order to increase the speed of the checkout operation, optical scanner devices have been incorporated into checkout counters for reading data encoded indicia on labels affixed to the purchased merchandise items. Movements of the merchandise items past the scanner device results in the scanner device reading the encoded indicia labels. To control the operation of the scanner device, detecting means have been positioned in the path of movement of the merchandise items to operate the scanner device in accordance with the position of the merchandise items with respect to the scanner device. Thus, a first or enter detector means positioned upstream of the scanner device will turn on the scanner device for operation upon detecting the presence of a merchandise item upstream of the scanner device, while a second or exit detector means located downstream of the scanner device will turn the scanner device off upon detecting the presence of the merchandise item downstream of the scanner device. In actual operation, it has been found that the checkout operator in moving a merchandise item past the scanner device will sometimes lift the item above the detectors so as not to trip one or the other detector means during the checkout operation. When this occurs, the operator is notified by signal lights localed in the checkout counter or by audio tones to repeat the read operation. In repeating the checkout movement, the operator will sometimes trip both detectors or one of the detectors in returning the merchandise item to a start position prior to moving the items past the scanner device in the proper direction, resulting in the mis-operation of the scanning device. It is therefore an object of this invention to provide an optical scanner control system which will efficiently utilize the scanner device irrespective of the movement of the merchandise items past the scanner device. It is a further object of this invention to provide a control system for operating the scanner device in a manner to force a prescribed mode of operation by the checkout operator to maximize the performance of the scanning unit.

SUMMARY OF THE INVENTION

In accordance with a preferred embodiment to this invention, there is provided a digital circuit operating in response to signals indicating the presence of a record member upstream and downstream of a code reading device and a signal indicating that the data read by the code reading device is valid. The circuit generates a good or bad read signal in accordance with the signals generated and the sequence of their generation, thereby determining whether a proper read operation has occurred. A single shot multivibrator is utilized in the circuit to limit the time the signals are to be generated before a new read operation is initiated.

BRIEF DESCRIPTION OF THE DRAWINGS

Additional advantages and features of the present invention will become apparent and fully understood from a reading of the following description taken together with the annexed drawing, in which.

DESCRIPTION OF THE PREFERRED EMBODIMENTS

Figure 1:
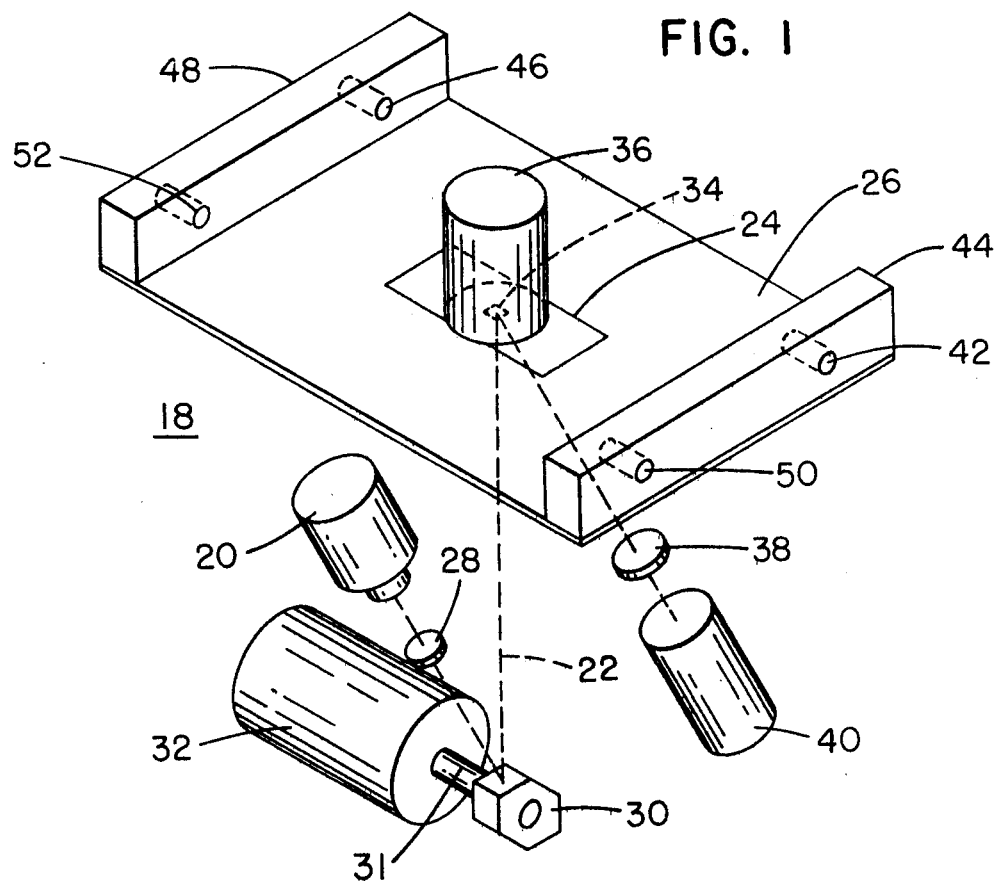
FIG. 1 is a perspective view of a portion of a check-out counter showing the general arrangement of the elements of the scanning assembly and the control gates.

Referring now to FIG. 1, there is shown a perspective view of the optical scanning system in which the present invention is utilized, the system including a scanning assembly generally indicated by the numeral 18 comprising a light source 20 emitting an optical scanning light beam 22 in the visible or near visible spectrum, the light beam being directed through an aperture 24 located in a supporting surface 26 of a checkout counter. The light source 20 may be a helium or neon laser that is pumped to produce a continuous laser beam of red monochromatic light of approximately 6,328 angstrom wavelength.

In a manner that is well known on the art, the light beam 22 produced by the source 20 may be focused by a lens system 28 onto a multi-faced mirror 30. The mirror 30 is mounted on the shaft 31 of a motor 32 which rotates the mirror 30 at a substantially constant speed. The mirror 30 is positioned to intercept the light beam 22 and project same through the aperture 24 to scan the encoded indicia located on a label 34 affixed to a merchandise item 36, the encoded indicia comprising a plurality of black and white coded areas representing data concerning the identity of the merchandise item. The rotation of the mirror 30 causes a succession of light beams 22 to scan any encoded label 34 positioned over the aperture 24.

The light beam 22 is reflected off the label 34 through an optical filter 38 to a photo-responsive pick-up device such as a photo multiplier 40 which converts the reflected light beams into electrical signals, the amplitude of which corresponds to the amount of light received. Thus, the amplitude of the light reflected from the white coded area on the label 34 will be greater than the light reflected from the black coded area. Conventional amplifying circuits will produce a relative high voltage which can be assigned a binary one when the beam 22 is scanning a black coded area on the label and a relatively low voltage to which is assigned a binary zero when scanning a white coded area. Thus, the information contained on the label 34 can be decoded and used for input to a terminal device for displaying and recording the information read.

To force a prescribed mode of operation by the checkout operator in order to maximize the operation of the scanning assembly 18, to provide the scanning assembly information as to when a merchandise item 36 is in the scanning area, and to enable the operation of the scanning assembly, sensing means in the form of photo detectors hereinafter referred to as item gates are positioned adjacent the front and rear of the aperture 24 to detect the presence or absence of a merchandise item 36 in that area. As shown in FIG. 1, the enter item gate may comprise a photodiode 42 or similar photoresponsive device mounted in an upstanding rail member 44 located adjacent one edge of the surface 26 of the checkout counter. Such photodiode 42 is positioned upstream of the aperture 24 and at a predetermined height above the surface 26 and received a continuous beam of light from a conventional light source 46 located in a rail member 48 mounted on the opposite edge of the surface 26. An exit item gate comprising a similar photodiode 50 is positioned downstream of the aperture 24 in the rail member 44. The photodiode 50 receives a light beam from a light source 52 located in the opposite rail member 48. Both photodiodes 42, 50 will generate a signal upon the interruption of the light beam in a manner that is well known in the art.

Figure 2:
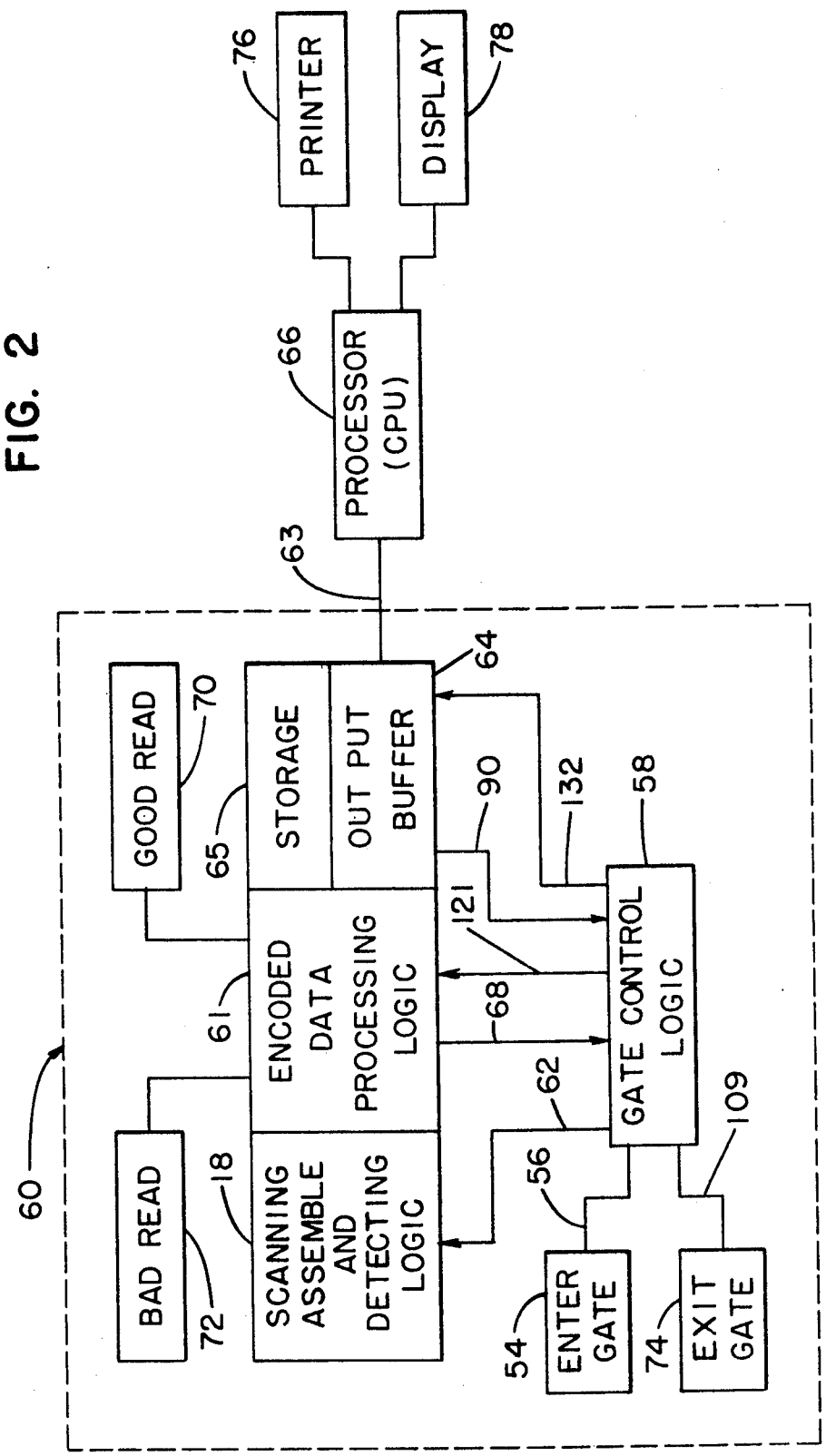
FIG. 2 is a simplified block diagram of the data processing system constructed in accordance with this invention.

Referring now to FIG. 2, there is shown a block diagram of the data processing system which incorporates the scanning assembly 18 of the present invention. Forward movement of a merchandise item 36 on the supporting surface 26 of the checkout counter (FIG. 1) will trip the enter item gate 54 by intercepting the light beam from the light source 46, thereby generating a control signal from the photodiode 42 over line 56 to a gate control logic unit 58 of the scanning system 60. The scanning system 60 of the present embodiment, shown in FIG. 2 within the dotted lines, includes the scanning assembly 18 which further includes detection logic for processing the signal from the scanning assembly, the item enter and exit gates 54, 74 discussed above with respect to FIG. 1, an encoded data processing logic unit 61 which may in some applications comprise a microprocessor for checking and decoding the encoded data read by the scanning assembly 18 and for generating a signal to the gate control logic unit 58 indicating the validity of the read operation, and a conventional memory storage 65 and output buffer 64 for transmitting the data read over line 63 to a central processing unit (CPU) 66. Examples of encoded data checking circuits which may be used to check the data read by the scanning assembly 18 may be found in U.S. Pat. Nos. 3,784,792, 3,906,203 and 3,753,227.

The control signal transmitted from the enter item gate 54 to the gate control logic unit 58 upon the tripping of the gate 54 by a merchandise item 36 will turn on the light source 20 in the scanning assembly 18 by transmitting a scanner enable signal over line 62 to the scanning assembly 18. The scanning assembly 18 will read the label 34 on the merchandise item 36 and transmit the data read to the encoded data processing logic unit 61. The processing logic unit 61 will decode and check the encoded data to determine if the data is valid or not and then generate a control signal over line 68 to the gate control logic unit 58 indicating a good or bad read operation. In addition, the logic unit 61 will generate a signal to light a display 70 on the checkout counter indicating a good read or a display 72 indicating a bad read. As will be described more fully hereinafter with respect to the gate control logic unit 58, the indication of a good read as determined by the logic unit 61, together with the tripping of the enter gate 54 and the exit gate 74 will provide the necessary control signals for operating the scanning assembly 18 in accordance with the present invention. When the encoded data read by the scanning assembly 18 is determined to be valid by the logic unit 61, the data will be transmitted to the output buffer 64 preparatory for transmission over line 63 to the CPU 66 which will cause the data to be printed by the printer 76 and displayed in the display 78 of a data terminal device (not shown) utilized in the checkout operation.

Figure 3:
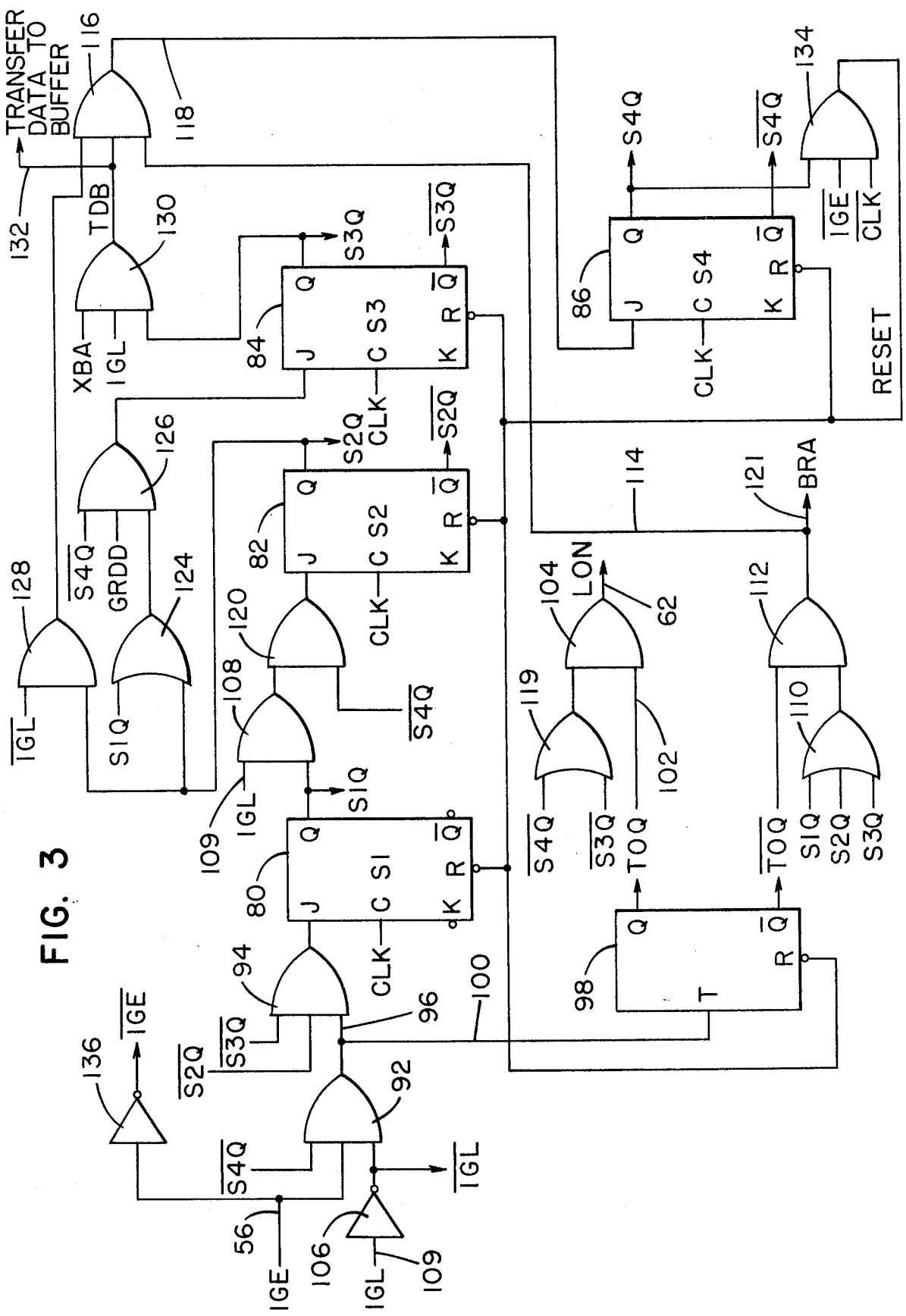
FIG. 3 is a detailed circuit diagram of the gate control logic unit of the sytem shown in FIG. 2.
Figure 4:
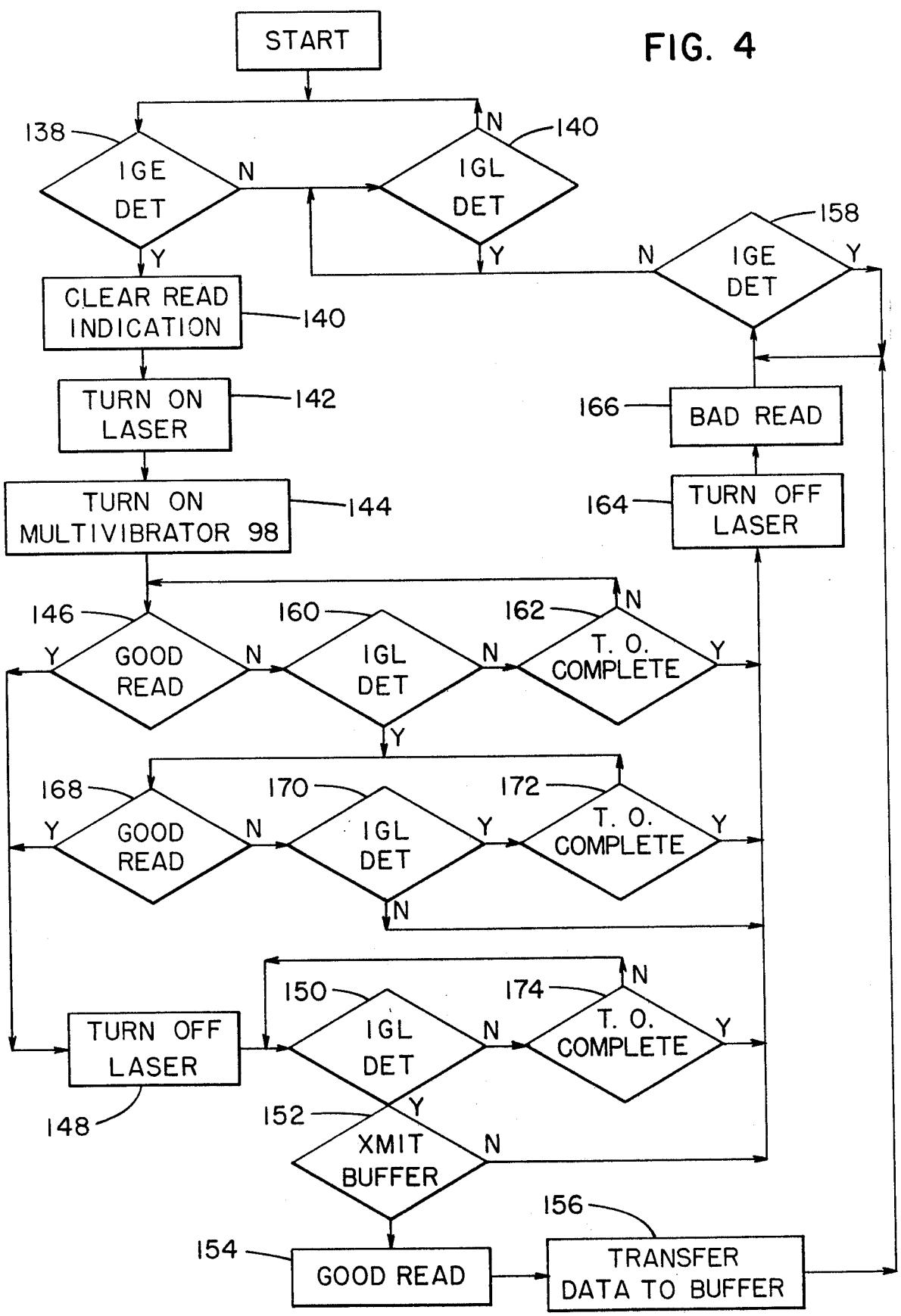
FIG. 4 is a simplified flow diagram illustrating the operation of the system.

Referring now to FIG. 3, there is shown circuit details of a gate control logic unit 58 (FIG. 2) for controlling the operation of the scanning assembly 18, which taken in conjunction with the flow diagram shown in FIG. 4 will disclose the overall system structure and operation. The logic circuit of FIG. 3 employs J-K flip-flops 80, 82, 84 and 86 which are of the type including a bistable circuit having two stable states which may be referred to as the "set" or "high" and "reset" or "low" states. Each such flip-flop includes a trigger input J such that a low to high transition on this input is always effective to switch the state of the flip-flop from its current state to the opposite state, and a reset input R such that a low to high transition thereon will switch the flip-flop from the set state to the reset state of the flip-flop when the flip-flop is in the set state. Each flip-flop 80, 82, 84 and 86 also has a set output Q and a reset output $\overline{Q}$ and the arrangement is such that when the flip-flop is in the set state, the set and reset outputs are high and low, respectively, and such that when the flip-flop is in a reset state, the set and reset outputs are low and high, respectively. Each flip-flop further has a clock input C for operating the flip-flop in a manner well known in the art.

The logic circuit shown in FIG. 3, in addition to the flip-flop 80, 82, 84 and 86, further includes a one-shot multivibrator 98 for limiting the time of each scanning operation of the assembly 18. Prior to the movement of a merchandise item 36 past the aperture 24 (FIG. 1) in the checkout counter surface 26, the logic circuit of FIG. 3 is normally in an idle state with each of the flip-flops 80, 82, 84 and 86 in a reset condition. Upon movement of a merchandise item 36 through the light beam generated by the light source 46, the enter gate 54 (FIG. 2) is tripped resulting in the signal 1GE (FIG. 3) which is high being transmitted from the photodiode 42 over line 56 (FIGS. 2 and 3) to one input of an AND gate 92 thereby enabling the AND gate 92. The other two inputs of the AND gate 92 are both high at this time and include the output term $\overline{1GL}$ of the exit item gate 74 and the output term $\overline{S4Q}$ of the flip-flop 86. The term $\overline{1GL}$ is the output term of an inverter 106 and is high when the term 1GL of the exit item gate 74 is low, the latter occurring when the exit item gate 74 is in its untripped condition. The AND gate 92 going high will enable an AND gate 94 over line 96 and further enable the single-shot multivibrator 98 for operation over line 100. The multivibrator 98 functions as a time-out and will be reset after a two second operation, thereby controlling the length of time the scanning assembly 18 will be enabled.

The output term T0Q of the multivibrator 98 upon going high will enable an AND gate 104 whose output term LON will be transmitted over line 62 (FIGS. 2 and 3) to the scanning assembly 18 which turns on the light source 20 (FIG. 1) allowing the scanning assembly 18 (FIG. 2) to scan the encoded label 34 (FIG. 1) in the manner described previously.

The enabling of the AND gate 94 (FIG. 3) by the tripping of the enter gate 54 (FIG. 2) will, in conjunction with the clock signal at the C input, set the J-K flip-flop 80 and thereby transfer the circuit of the gate control logic unit 58 (FIG. 2) from an idle state to a first state. When the control logic unit 58 is in the first state, the system is conditioned to operate only when one of the following events occur; the exit item gate 74 (FIG. 2) is tripped; a signal is received from the encoded data processing logic unit 61 indicating that a good read was obtained by the scanning assembly 18, or the multivibrator 98 times out. Setting of the flip-flop 80 will result in the output term S1Q going high which conditions an AND gate 108 for operation upon the tripping of the exit item gate 74 (FIG. 2). If this event occurs immediately after the tripping of the enter item gate 54, a signal 1GL generated by the photodiode 42 (FIG. 1) over line 109 (FIG. 2) to the control logic unit 58 will enable the AND gate 108 whose output will enable an AND gate 120 and thereby set the flip-flop 82 which places the control logic unit 58 in a second state. When in the second state, the control logic unit 58 is conditioned to either complete the read operation upon receiving a good read signal from the processing logic unit 61 or require the operator to initiate another scanning operation. This latter event will occur if such good read signal is not received by the control logic unit 58 within two seconds or whatever time the multivibrator 98 is set to time out, or if the exit item gate 74 returns to its uninterrupted state, the circuit of the logic control unit 58 returning to its idle state upon the enter gate 54 being cleared of a merchandise item in a manner that will now be described.

The output term S1Q of flip-flop 80 (as shown in FIG. 3) is also applied to the OR gate 110 whose output is applied to one input of the AND gate 112. Upon the timing out of the multivibrator 98, the output term $\overline{T0Q}$ of such multivibrator 98 goes high enabling AND gate 112 whose output term BRA is transmitted over line 114, through OR gate 116 and over line 118 to set the flip-flop 86 and thereby put the circuit of the control logic unit 58 in a fourth state. The output term BRA indicating a bad read is also transmitted to the encoded data processing logic 61 over line 121 (FIG. 2) which turns on the display 72 indicating to the operator the bad read result of the scanning operation, requiring the operator to initiate another read operation. When the circuit of the control logic unit 58 is in the fourth state, a valid read operation cannot be obtained and as described above, the system will return to the idle state in a manner described hereinafter upon the enter item gate 54 returning to its uninterrupted condition, thereby conditioning the scanning system 60 for a new read operation.

The output term S1Q of flip-flop 80 is also applied to one input of the OR gate 124, thereby conditioning the AND gate 126 for operation upon receiving the term GRDD from the data processing logic 61 (FIG. 2) over line 68 indicating that a good read has been obtained from the scanning assembly 18. When this occurs the output of AND gate 126 will set the flip-flop 84 which puts the circuit of the control logic unit 58 in a third state. When the circuit reaches this third state, the light source 20 (FIG. 1) is turned off and steps are taken to transfer the decoded data from the data processing logic 61 (FIG. 2) to the buffer 64 for further processing by the processor 66.

The setting of flip-flop 82 upon the successive tripping of the enter 54 and exit gates 74, will make the output term S2Q of the flip-flop 82 high and the term $\overline{S2Q}$ low. The output term $\overline{S2Q}$ going low will disable AND gate 94 while the term S2Q going high will condition the AND gate 126 to set the flip-flop 84 upon the receiving of the good read signal GRDD from the data processing logic unit 61. The term S2Q is also applied to the AND gate 128 which is enabled by the return of the exit item gate 74 to its clear or uninterrupted position which occurs when the merchandise item clears the exit item gate 74. This sets the flip-flop 86 through OR gate 116 which puts the circuit of the control logic unit 58 in the fourth state. When in the fourth state, the circuit indicates that the merchandise item has passed through the scanning assembly 18 without a good read being obtained. As shown in FIG. 3, the output signal 1GL of the exit item gate 74 is transmitted over line 109 (FIG. 2) to inverter 106 whose output term $\overline{1GL}$ will be high when the exit gate 24 is in the uninterrupted position. The term S2Q is further applied to OR gate 110 thereby conditioning AND gate 112 to set the flip-flop 86 upon the timing out of the multivibrator 98 in the manner described previously.

The setting of flip-flop 84 which occurs when the good read signal GRDD has been transmitted from the processing logic 61 to the AND gate 126 will result in the output term S3Q going high while term $\overline{S3Q}$ goes low the latter of which disables AND gate 94 and AND gate 104 thereby turning off the light source 20 in the scanning assembly 18. The term S3Q is applied to the AND gate 130 which conditions the AND gate 130 for operation upon the tripping of the exit item gate 74 and the receiving of a signal XBA from logic within the buffer 64 over line 90 indicating that the buffer 64 has space available to receive data from the storage 65 (FIG. 2) for transmission to the processor 66. The output signal TDB (Transfer Data Buffer) of AND gate 130 is transmitted over line 132 to initiate the transfer of data to the buffer 64. This output signal is also transmitted through OR gate 116 and over line 118 to set the flip-flop 86. The term S3Q is further applied to OR gate 110 thereby conditioning AND gate 112 to set flip-flop 86 upon the timing out of the multivibrator 98.

The setting of flip-flop 86 upon the timing out of multivibrator 98, the enabling of AND gate 130 or AND gate 128 as described previously, results in the output term S4Q going high while term $\overline{S4Q}$ goes low, the latter of which disables AND gates 92, 120, and 126 thereby preventing the setting of flip-flop 80, 82 and 84. The term $\overline{S4Q}$ also disables AND gate 104 after being applied to one of the inputs of OR gate 119 which disables AND gate 104 from operation since the input term $\overline{S3Q}$ is low due to the flip-flop 84 being in a set condition. As described previously, the output term LON of AND gate 104 turns on the light source 20 in the scanning assembly 18 (FIG.1). Output term S4Q going high further conditions AND gate 134 for operation upon receiving the signal 1GE which goes high upon the enter item gate 54 returning to its uninterrupted condition after the merchandise item has cleared the gate. IGE going low will produce $\overline{1GE}$ in a high state after going through inverter 136. The output term RESET of AND gate 134 going high will reset the flip-flops 80, 82, 84 and 86 and the multivibrator 98 returning the logic circuit (FIG. 3) to the idle state preparatory to another read operation.

Referring to FIG. 4 there is shown a flow diagram of the events that occur in the operation of the scanner unit 60 (FIG. 2). Prior to the movement of a merchandise item past the scanning assembly 18, the circuit of the control logic unit 58 (FIG. 3) is in the idle state which requires the enter item gate 54 to be tripped in order to initiate a scanning operation. If the operator at this time moves the merchandise item past the aperture 24 in the counter surface 26 without tripping the enter item gate but trips the exit item gate 74 or moves the item in the reverse direction, thereby tripping the exit item gate 74 first, the system will remain in the idle state and cycle between blocks 138 and 140.

Upon tripping of the item enter gate 54, the circuit will enter the first state wherein a clear read signal (block 142) is generated to condition the data processing logic 61 and its associated circuits for a new read operation, the scanning assembly 18 (FIG. 1) is turned on (block 144) and the multivibrator 98 (FIG. 3) is activated. If a good read is detected (block 146) the circuit will enter state 3 and the light source 20 (FIG. 1) will be turned off (block 148). If the exit item gate 74 (FIG. 2) has been tripped (block 150) and the transmit buffer 64 (FIG. 2) is available to receive data (block 152), the good read display 70 (FIG. 2) is illuminated (block 154) and the data is transferred to the buffer 64 (block 156) for transmission to the processor 66. The circuit is now in the fourth state. Upon the returning of the enter item gate to its clear condition (block 158), the circuit will return to the idle state (block 138, 140) preparatory to another read operation.

If after the light source 20 (FIG. 1) has been turned on and the circuit of the control logic unit 58 fails to receive a good read signal from the data processing logic 61 (FIG. 2) the circuit will check the exit item gate (block 160) to see if it has been tripped. If it has not, the circuit will cycle until a good read signal is received (block 146) or the multivibrator 98 times out (block 162). If the latter occurs first, the light source 20 will be turned off (block 164), the Bad Read display 72 (FIG. 2) is illuminated (block 166) and the circuit returns to the idle state.

If the enter item gate 54 and exit item gate 74 are tripped but the scanning assembly 18 fails to detect a good read, the circuit will go through blocks 160, 168, 170, and 172 to turn off the scanning assembly 18 preparatory to another read operation.

If a good read is obtained but the exit item gate 74 is not tripped, the circuit will cycle between block 150 and block 174 until a time out occurs thus resetting the scanning assembly 18 preparatory to a new read operation. If the exit item gate 74 does trip, but the buffer 64 (FIG. 2) is not available to receive the data, (block 152), the circuit will indicate a bad read (block 166) and force the operator into another read operation.

It will be seen from the above description that the circuit of the control logic unit 58 will force a proper merchandise item movement past the scanning assembly 18 which requires that the enter item gate be tripped before the exit item gate and before a good read signal is generated. The circuit will ignore an item movement in the reverse direction and will illuminate the bad read display if the above events do not occur in the sequence indicated, the transmit buffer is not available or if only the enter item gate is tripped thereby forcing the operator to initiate a new read operation by moving the merchandise item in the proper direction past the aperture 24 (FIG. 1) in the checkout counter surface 26.

While only one embodiment of the invention has been described in detail herein and shown in the accompanying drawings, it will be obvious that variations and other embodiments are possible without departing from the scope of the invention. It is thus contemplated that all such variations and embodiments not departing from the spirit and scope of the invention hereof shall be construed in accordance with the following claims.

What is claimed is:

1. A system for controlling the operation of a code reading device for reading data encoded indicia on a record member upon movement of the record member past the reading device, said system comprising:

(a) a first detecting means positioned upstream of the code reading device for generating a first signal upon detecting the presence of a record member, said first signal initiating the operation of said code reading device;

(b) means responsive to the operation of the reading device for generating a second signal indicating the validity of the indicia read by the code reading device;

(c) a second detecting means positioned downstream of the code reading device for generating a third signal upon detecting the presence of a record member;

(d) and logic means responsive to said first, second and third signals for determining the validity of said read operation including means actuated by said first signal for disabling said logic means after a predetermined time has elapsed thereby limiting the time said second and third signals are to be used in determining the validity of said read operation.

2. The invention according to claim 1 wherein said logic means includes first and second bistable means capable of being set to a first state and a second state, said first bistable means being responsive to said first signal so that said first bistable means changes from said first state to said second state upon the detection of a record member by said first detecting means, said second bistable means being coupled to said first bistable means and responsive to said second signal for changing from said first state to said second state as long as said first bistable means is in said second state, said logic means further includes a first logic gate coupled to said second bistable means and responsive to said third signal as long as said second bistable means is in said second state to provide a fourth signal indicating a good read operation of said code reading device.

3. The invention according to claim 2 wherein said logic means further includes a third bistable means capable of being set to a first state and a second state, said third bistable means being coupled to said first bistable means and responsive to said third signal to change from said first state to said second state upon the detection of a record member by said second detecting means as long as said first bistable means is in said second state, said logic means includes a second logic gate coupled to said second bistable means and responsive to said second signal as long as said third bistable means is in said second state to set said second bistable means to said second state.

4. The invention according to claim 3 in which the system further includes means for storing data read by said code reading device and processing means for generating a fifth signal indicating said storage means is available to store the data read by said code reading means, said first logic gate being responsive to said fifth signal as long as said second bistable means is in said second state to provide said fourth signal indicating a good read operation of said code reading device.

5. The invention according to claim 4 which further includes indicator means responsive to said fourth signal to indicate a good read operation of said code reading device.

6. The invention according to claim 4 in which said first detecting means generates a sixth signal upon detecting the absence of a record member, said logic means further includes a fourth bistable means capable of being set to a first state and a second state, said fourth bistable means being coupled to said first logic gate and responsive to said fifth signal to change from said first state to said second state, said logic means further includes a third logic gate coupled to said first, second and third bistable means and responsive to said sixth signal when the fourth bistable means is in said second state to set said first, second and third bistable means to said first state to condition the logic means for a new read operation.

7. The invention according to claim 6 in which said disabling means comprise a fifth bistable means capable of being set to a first state and a second state, said fifth bistable means being responsive to said first signal so that said fifth bistable means changes from said first state to said second state for a predetermined time interval, said first bistable means being coupled to said fourth bistable means to set said fourth bistable means to said second state upon being set to said first state upon the lapse of the time interval.

8. The invention according to claim 7 which further includes second indicator means responsive to said fifth bistable means being set to said first state after the lapse of said predetermined time interval to indicate a bad read operation of said code reading device.

9. A system for controlling the operation of a code reading device for reading data encoded indicia on a record member upon movement of the record member past the reading device, said system comprising:
(a) a first detecting means positioned upstream of the code reading device for generating a first level signal upon detecting the presence of a record member and a second level signal upon detecting the absence of a record member, said first level signal initiating the operation of said code reading device;
(b) means responsive to the operation of the code reading device for generating a validity signal indicating the data read by the code reading device is valid;
(c) a second detecting means positioned downstream of said code reading device for generating a third level signal upon detecting the presence of a record member and a fourth level signal upon detecting the absence of a record member;
(d) and logic means responsive to said first level, third level and validity signals for determining the validity of the read operation of the code reading device including a reset interval determining means actuated by said first level signal for disabling said logic means after a predetermined time interval has elapsed thereby limiting the time said third level and validity signal are to be generated.

10. The invention according to claim 9 wherein said logic means includes a first and second bistable means capable of being set to a first state and second state, said first bistable means being responsive to said first level signal so that said first bistable means is changed from said first state to said second state, said second bistable means coupled to said first bistable means and responsive to said validity signal for changing from said first state to said second state when said first bistable means is in said second state, and said logic means includes a first logic gate coupled to said second bistable means and responsive to said third level signal as long as said second bistable means is in said second state to provide a valid read signal indicating a valid read operation of the code reading device.

11. The invention according to claim 10 wherein said logic means further includes a third bistable means capable of being set to a first and second state, said third bistable means being coupled to said first bistable means and responsive to said third level signal to change from said first state to said second state when said first bistable means is in said second state, and said logic means further includes a second logic gate coupled to said second and third bistable means and responsive to said validity signal when said third level bistable means is in said second state to set said second bistable means to said second state whereby, upon the generation of said third level signal, said first logic gate will generate said valid read signal.

12. The invention according to claim 11 which further includes indicator means responsive to said valid read signal to indicate a valid read operation of said code reading device.

13. The invention according to claim 11 wherein said logic means further includes a fourth bistable means capable of being set to a first and second state, said fourth bistable means coupled to said third bistable means and responsive to said fourth level signal to change from said first state to said second state when said third bistable means is in said second state, and said logic means further includes a third logic gate coupled to each of said bistable means and responsive to said second level signal when said fourth bistable means is in said second state to generate a reset signal to set each of said bistable means to said first state.

14. The invention according to claim 13 in which said reset interval determining means comprises a fifth bistable means capable of being set to a first and second state, said fifth bistable means responsive to said first level signal to change to said second state for a predetermined time interval after which the fifth bistable device returns to said first state, said fifth bistable means being coupled to said fourth bistable means to set said fourth bistable means to said second state upon the lapsing of the time interval.

15. The invention according to claim 14 which further includes second indicator means responsive to said fifth bistable means being set to said first state after the lapse of said predetermined time interval to indicate a bad read operation of said code reading device.

16. A method for operating a code reading device which reads data encoded indicia on a record member that is moved past the code reading device comprising the steps of:
(a) generating a first signal indicating the presence of a record member upstream of the code reading device;
(b) initializing a reset interval time period in response to the generating of said first signal;
(c) operating a code reading device in response to the generating of said first signal;
(d) checking the data read by said code reading device;
(e) generating a second signal indicating the data read is valid;
(f) generating a third signal upon detecting the record member downstream of the code reading device;
(g) and generating a good read signal upon the generating of said second and third signal before the reset interval time period has elapsed.

* * * * *